United States Patent [19]
Kees

[11] Patent Number: 4,968,258
[45] Date of Patent: Nov. 6, 1990

[54] REUSABLE LEARNING AID

[76] Inventor: Max O. Kees, 1001 Boniface Space 16a, Anchorage, Ak. 99504

[21] Appl. No.: 402,350

[22] Filed: Sep. 1, 1989

[51] Int. Cl.$^5$ .............................................. G09B 19/00
[52] U.S. Cl. ................................. 434/370; 434/365; 434/408
[58] Field of Search ............... 434/409, 308, 370, 379, 434/408, 413, 416, 365; 40/594

[56] References Cited

U.S. PATENT DOCUMENTS

| | | |
|---|---|---|
| 1,757,287 | 5/1930 | Bildstein . |
| 2,586,017 | 2/1952 | Freedman ...................... 434/304 X |
| 2,608,771 | 9/1952 | Sparks . |
| 2,791,040 | 5/1957 | Santorelli . |
| 3,092,400 | 6/1963 | Smith . |
| 3,206,225 | 9/1965 | Oleson . |
| 3,252,462 | 5/1966 | Quarton et al. . |
| 3,553,864 | 1/1971 | Karlyn et al. . |
| 3,642,191 | 2/1972 | Roof .................. 434/408 X |
| 3,838,520 | 10/1974 | Quenot ..................... 434/408 X |
| 4,427,391 | 1/1984 | Berman .................. 434/408 |
| 4,741,119 | 5/1988 | Baryla .................... 40/594 |

FOREIGN PATENT DOCUMENTS

| | | | |
|---|---|---|---|
| 112374 | 1/1918 | United Kingdom ............... 434/413 |
| 464303 | 4/1937 | United Kingdom ............... 434/408 |

Primary Examiner—Richard J. Apley
Assistant Examiner—Rachel M. Healey
Attorney, Agent, or Firm—Mark E. Ogram

[57] ABSTRACT

A learning aid permitting the student to insert a worksheet into a rigid body having space between two planes. One of the plaens is clear permitting the instructor to mark on it, performing the work demanded by the underlying worksheet. The instructor's marking is erased and the student attempts the same task. The work sheet is secured in place either by (i) its natural mechanical tension with the two planes, or (ii) by an insert mechanism securing the paper either through electrical attraction or by a mechanical clip.

6 Claims, 2 Drawing Sheets

REUSABLE LEARNING AID

BACKGROUND OF THE INVENTION

This invention relates to teaching and more particularly to aids for teaching.

Learning, especially at the lower grade levels, is through the repetitive performance of a task such as spelling, mathematics, geography, etc. The student is taught how the task is performed by observing the instructor perform the same or similar task and thereafter attempting the task themselves.

Traditionally, this teaching is accomplished via a blackboard or other such display on a wall. The instructor prints a problem and explains the steps of the solution. The students are supplied with paper worksheets that have similar problems.

Although the paper worksheets are inexpensive to print, for young students many mistakes are made before the task is correctly performed. These mistakes must be erased; on paper this causes rips, tears, and smudges which inhibits the student in the learning process.

The blackboard itself creates problems. Whereas, the traditional classroom had the entire classroom working on the same problem; the modern classroom recognizes that students are individuals and perform their tasks and learn new ones at varying speeds. In the modern classroom, many subjects permit the student to "self-pace" or learn the subject at a speed with which the student feels comfortable.

This improved approach to teaching means that the instructor is faced with the situation that multiple lessons are being performed simultaneously within the class. Explaining a particular task on the blackboard is not only cumbersome but is disruptive. Students who are either behind the task being performed or ahead of it find the black-board work confusing and interruptive.

Recognizing that it is desirable to be able to use the worksheet itself as a visual reference, several devices have been made permitting the worksheet to be secured under a clear plate. By writing on the clear plate, the worksheet can be repeatedly completed without actually marking on the worksheet.

One such device is described in U.S. Pat. No. 1,757,287, entitled "Perpetual Pad" issued May 6, 1930, to Bildstein. In the Bildstein device, the worksheet is mechanically squeezed between two plates and locked into position. This arrangement requires the use of heavy materials and hinges. The plates, when opened and shut, are disruptive in the classroom and are difficult for small children to utilize.

To reduce the weight and complexity of these types of devices, a group of binders were developed which mechanically clasp the worksheets along one edge. Such devices are described in: U.S. Pat. No. 3,553,864, entitled "Map Holder" issued Jan. 12, 1971, to Karlyn et. al; U.S. Pat. No. 2,791,040, entitled "Map Folio" issued May 7, 1957, to Santorelli; U.S. Pat. No. 3,092,400, entitled "Loose Leaf Binder" issued June 4, 1963, to Smith; and, U.S. Pat. No. 3,252,462, entitled "Binder for Magazines and the Like" issued May 24, 1966, to Quarton et. al.

In all of these devices, the worksheet or map is clasped along one edge. Removing the worksheet is difficult and cumbersome in a classroom situation.

Another attempted solution to the problem is to place the paper worksheet between two flexible sheets of clear plastic. The sheets sandwich the paper worksheet therebetween. This secures the worksheet in place permitting the student/user to work out the problem without marking the paper.

This type of arrangement is described in U.S. Pat. No. 3,206,225, entitled "Self-Hinging Laminated Plastic Folders" issued Sept. 14, 1965, to Oleson; and, U.S. Pat. No. 2,608,771, entitled "Writing Pad" issued Sept. 2, 1952, to Sparks.

Although this approach does provide ease in use, the flexible plastic is not conducive to repeated writing and erasure. Repeated use smudges the thin plastic.

Additionally, the ink from the underlying paper is transferred to the plastic. This creates smudges on the plastic, diminishing the transparency of the plastic.

It is clear from the foregoing that an effective solution does not exist.

SUMMARY OF THE INVENTION

This invention utilizes two rigid plates which are spaced apart from each other. The worksheet is inserted between the plates permitting it to be viewed through one of the plates. The problems on the worksheet can be performed and erased many times by either the instructor or the student without marking on or erasing from the worksheet.

A spacer is used to maintain the plates in their respective positions. The spacer extends around the periphery of the plates leaving one end open for the insertion of the worksheet.

In one embodiment of the invention, the natural "wavy" aspect of the paper is used to contact the plates. This contact, even limited as it is, provides sufficient friction to maintain the worksheet within the learning aid.

As an alternative embodiment to the reliance of the friction between the paper and the learning aid, an electrical charge is established on one plate of the learning aid to attract and secure the paper. This charge may be established a variety of ways as is well known to those of ordinary skill in the art.

In another embodiment, the worksheet is secured in place between the two plates through the use of the insert mechanism. The insert mechanism is a rigid body having two sides. The paper is secured to the insert mechanism either through electrical attraction or through the use of a clipping mechanism.

The clipping mechanism as used in this context is any of those well known to those of ordinary skill in the art. The key is to permit the student to physically attach/deattach the worksheet to the insertion mechanism.

In the alternative embodiment of the insert mechanism, an electrical charge is established on one side of the insert mechanism. This electrical charge attracts and secures the worksheet during insertion/removal as well as during the performance of the work by the student.

In this embodiment, the electrical charge is created either by a power source or through student action in charging the plate. Creation of the electrical charge by the student is accomplished by a variety of mechanisms well known to those skilled in the art including, but not limited to, the use of a rubber rod for the collection of the charge. Once manually charged, the rod is touched to the learning aid to transfer the charge.

The insert mechanism performs many functions: (i) it maintains the worksheet in close proximity to the transparent plate so as to remove or minimize distortion; (ii) the insert mechanism also provides for a clipboard-type of arrangement to be used independent of the learning aid; and, (iii) in one embodiment, the reverse side of the insert mechanism is felt lined permitting the instructor to place shapes (i.e. stars, squares, alphabet characters, etc.) for the young student to outline on the learning aid.

In one embodiment of the invention, both one side of the insert mechanism and the second side of the learning aid are reusable writing surfaces such as a black-board or white-board. This permits the student to perform scratch work or a different task without affecting the worksheet.

In practice, the present learning aid permits the instructor to give one-on-one instruction to a student at the student's desk or the instructor's desk. The task is performed by the instructor, erased, and then the student attempts the same task.

The entire process is done in a manner which minimizes any disruption to the remainder of the class.

The invention, together with various embodiments thereof will be more clearly described by the following drawings and their accompanying descriptions.

DRAWINGS IN BRIEF

DRAWINGS IN DETAIL

Figure 1A:
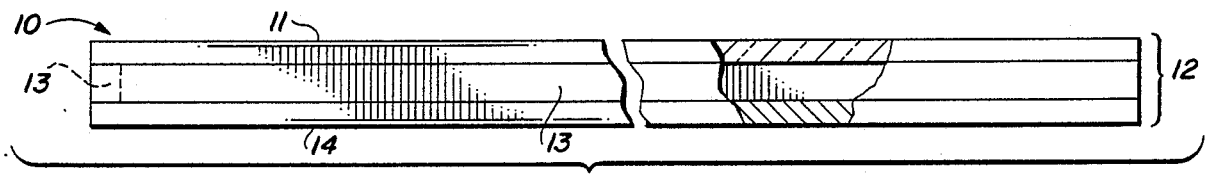
FIG. 1a is a side view of an embodiment of the invention illustrating the relationship of the plates with the spacer mechanism.

FIG. 1a illustrates an embodiment of the invention utilizing an electrical charge placed on the learning aid itself. This electrical charge is used to secure the worksheet within the learning aid.

Learning aid 10 has a top plate 11 which is substantially parallel to the bottom plate 14. The two plates are maintained in their relationship by spacer 13 which extends around the periphery of top plate 11 and bottom plate 14 with the exception of side 12. Side 12 is devoid of spacer 13 permitting the insertion of the worksheet.

In this embodiment, top plate 11 is a clear plastic panel having a thin layer of Teflon-type coating (not shown). This coating is thin enough not to disrupt the visual clarity of top plate 11. The coating permits the storage of the electrical charge discussed earlier.

The electrical charge is high voltage/low current. This creates the electrical attraction; but, due to the low current, cannot harm the student. Creation of the electrical charge is through a variety of methods obvious to those of ordinary skill in the art including the use of a battery/capacitor arrangement or the manual charging of a rubber rod.

Figure 1B:
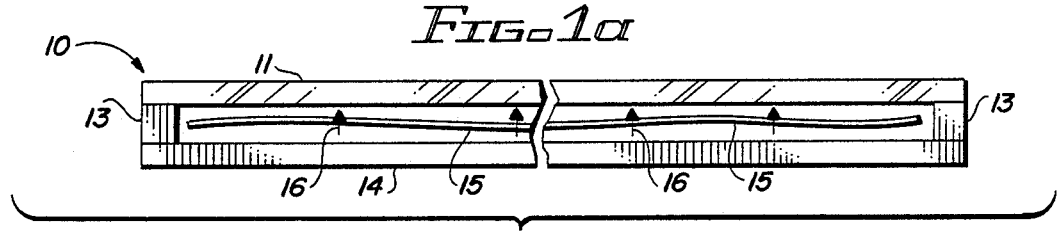
FIG. 1b is an end view of the embodiment illustrated in FIG. 1a, illustrating the insertion of the worksheet and the electrical attraction attribute.

FIG. 1b illustrates the embodiment first discussed in FIG. 1a as viewed towards side 12. Once charged, the top plate 11 creates an electrical attraction upon the paper worksheet 15, as illustrated by arrows 16. This secures the worksheet within the learning aid so that it doesn't move excessively or inadvertently fall from the learning aid.

As is clear from FIG. 1b, side 12 of learning aid 10 is open permitting the worksheet to be readily inserted. The end opposite end 12 has stops therein to secure the paper from falling through.

In this embodiment of the invention, plate 14 is not clear. Plate 14 is composed of a reusable material such as a "black-board" type material to permit the student to perform "scratch work" or other type of work which does not require a worksheet. Plate 14 expands the utility of the learning aid 10.

Although the embodiment of FIGS. 1a and 1b utilize electrical attraction, other embodiments do not. Paper is seldom perfectly flat. It has waves and natural bend. When inserted between two plates spaced close enough together, the paper presses against the plates. This creates frictional bonding, securing the paper.

Figure 2:
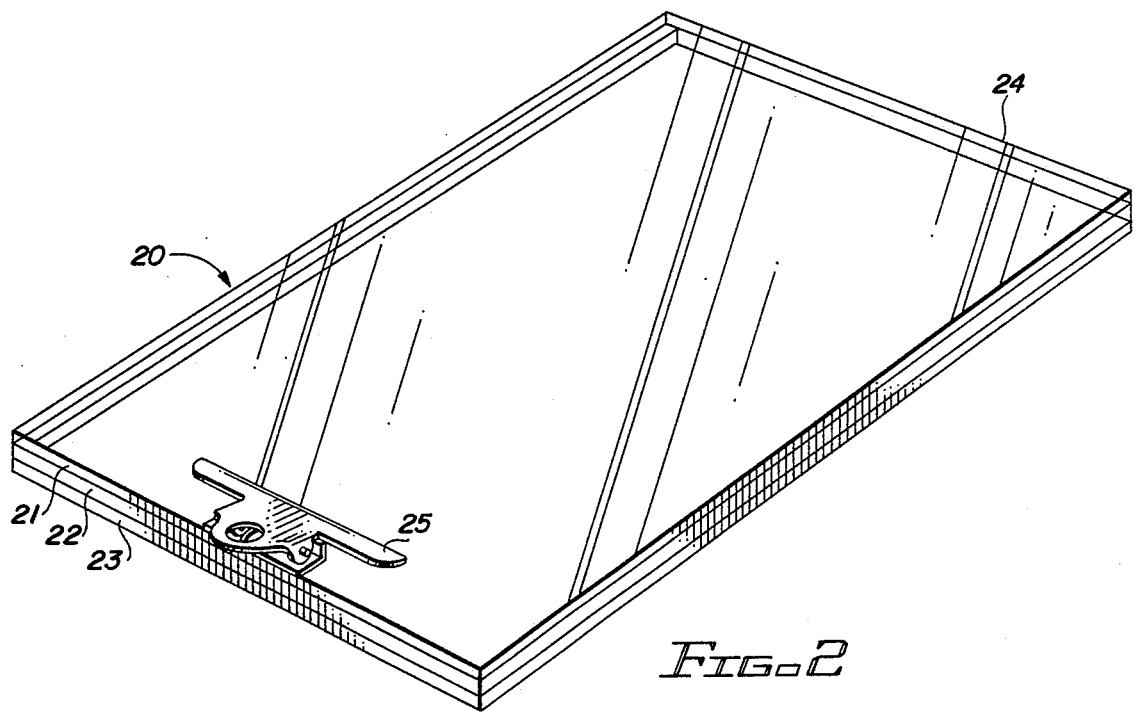
FIG. 2 is a perspective view of an embodiment of the invention.

FIG. 2 illustrates another embodiment of the invention. In this embodiment, learning aid 20 again has the top plate 21 and bottom plate 23 maintained by spacer 22. Open end 24 permits the insertion of the worksheet.

Opposite end 24 is a clasp 25 for the securing of paper. This clasp 25 permits the learning aid to be used as a clip board. The student with this embodiment can practice with the worksheet inside the learning aid 20 until the work is perfected. The worksheet is removed and placed on top of the learning aid, secured by clasp 25 permitting the worksheet to be completed for submission to the instructor.

This embodiment permits the learning aid to perform not only as its primary function, that of a learning aid, but also as a clipboard.

Figure 3:
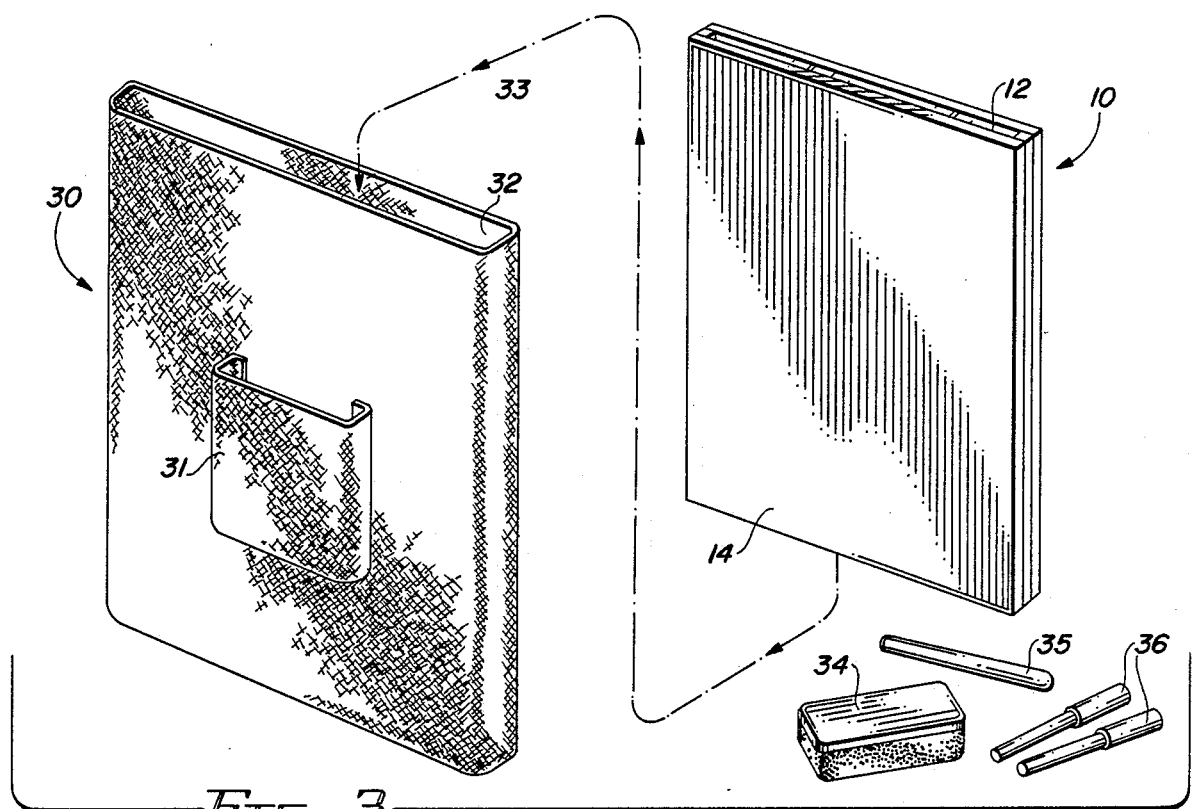
FIG. 3 is a perspective view of an embodiment of the invention using a carrying case.

FIG. 3 pictorially illustrates an embodiment of the invention using a backpack arrangement for holding the various components.

Learning aid 10 is inserted into the pack 30 via opening 32 as illustrated by arrows 33. Pack 30 is supplied with carrying straps (not shown) as well as mounting straps (also not shown) to secure the pack to the edge of a desk or the back of a chair.

Pocket 31 contains the implements necessary for use of the learning aid 10, first illustrated in FIGS. 1a and 1b. This includes eraser 34, rubber rod 35, and marking pens 36.

One side of eraser 34 is composed of a material that places an electrical charge into rubber rod 34 when rubbed thereagainst. Those of ordinary skill in the art readily recognize various materials that can be used for this purpose.

Once charged, rubber rod 35 is touched to the learning aid to transfer the charge to the clear plate and thereby secure the worksheet. The charge applied can be as great as the student wants; all the student needs to do is rub the rod more.

In an alternative embodiment, the charging mechanism is supplied by the insertion/withdrawal of the learning aid. In this embodiment, a rubber edge to the learning aid is provided which rubs against suitable material fastened to pack 30.

Figure 4:
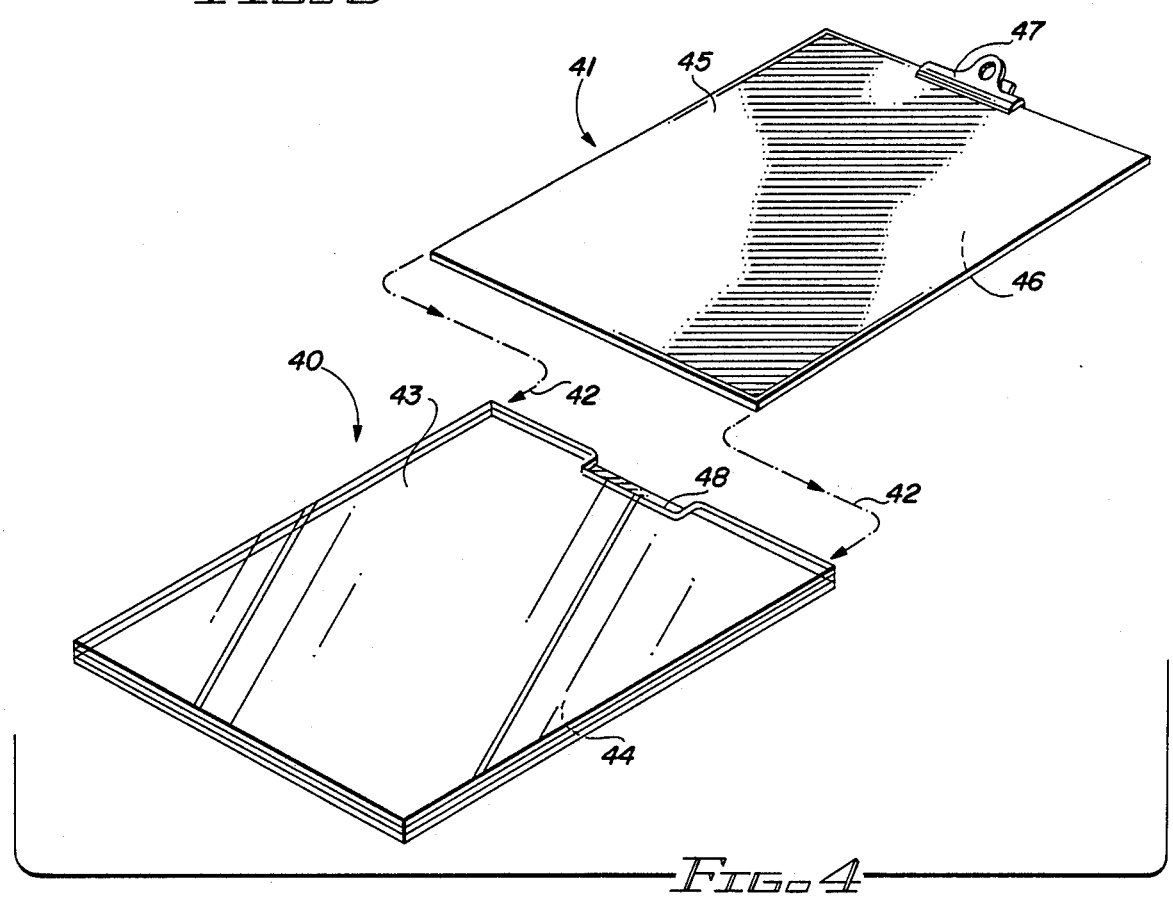
FIG. 4 is a perspective view of the preferred embodiment of the invention utilizing the insert mechanism.

FIG. 4 is a perspective view of the preferred embodiment of the invention utilizing the insert mechanism to secure and position the worksheet within the learning aid.

Learning aid 40 is a similar construction as those discussed in earlier drawings. It has a top clear plate 43. The other side of the learning aid 40 is a reusable writing surface 44 such as a black-board or white-board arrangement.

Insert mechanism 41 is a substantially flat unit having a first side 45 and a second side 46. The first side 45 is preferably a reusable writing surface; the second side 46 is preferably felt covered. At the top of the first side is a fastening or clipping mechanism 47 used to secure a worksheet to the insert mechanism 41.

Once the worksheet is attached to the insert mechanism 41, the entire assembly is inserted into the learning aid 40 as indicated by arrows 42. Slot 48 permits the clip 47 to nest therein.

The arrangement of insert 41 permits the student to use its first side 45, with its reusable writing surface, to act as a scratch pad or with its clip 47, to act as a standard clipboard. In the latter situation, that of a clipboard, insert 41 operates independently of learning aid 43.

The second side 46, with its felt surface, permits the instructor to place designs, outlines, characters, numerals, etc. thereon. The insert mechanism 41 is flipped and inserted into the learning aid 40. These characters are then exposed through the transparent surface 43 permitting the young student to repeatedly copy/outline them on the erasable surface 43 until the shape is memorized. All of this is done without disturbing the underlying shapes.

It is clear from the foregoing that the present invention provides an improved learning aid.

What is claimed:

1. A reusable learning aid comprising:
   (a) a first rigid layer having four edges and being transparent, said first layer accepting markings thereon and erasure therefrom;
   (b) a second rigid layer substantially the same shape and size as said first layer;
   (c) spacing means positioned around a portion of the periphery of said first layer for maintaining said first layer and said second layer in a fixed spaced apart relationship and for creating an air pocket therebetween; and,
   (d) an insert mechanism for insertion thereof between said first layer and said second layer by an operator, said insert mechanism having means for securing a sheet of paper thereto including means for establishing an electrical charge on said insert mechanism.

2. The reusable learning aid according to claim 1 wherein said means for establishing an electrical charge is introduced by said operator.

3. A study mechanism comprising:
   (a) a first rigid layer being substantially rectangular in shape and composed of a clear material permitting the writing and erasure thereon;
   (b) a second rigid layer being substantially rectangular in shape;
   (c) spacing means for securing said first layer substantially parallel to said second layer in spaced apart relationship;
   (d) an insert mechanism being susceptible to operator insertion between said first layer and said second layer and having a first side and a second side and means for securing a sheet of paper to the first side of said insert mechanism including means for placing an electrical charge on the first side of said insert mechanism.

4. The study mechanism according to claim 3 wherein said means for placing an electrical charge includes means for operator introduction of said electrical charge.

5. An assemblage for the assistance of study comprising:
   (a) a learning aid having,
      (1) a first layer being substantially rectangular in shape and composed of a clear material permitting the writing and erasure thereon,
      (2) a second layer being substantially rectangular in shape,
      (3) spacing means for securing said first layer substantially parallel to said second layer in spaced apart relationship;
   (b) an insert mechanism being operator insertable between said first layer and said second layer of said learning aid, said insert mechanism having a first side and a second side and means for securing a sheet of paper to the first side thereof including means for placing an electrical charge in said first side of said insert mechanism;
   (c) at least one writing instrument for marking on said first layer; and,
   (d) a carrying case for holding said learning aid, said insert mechanism, and said at least one writing instrument.

6. The assemblage according to claim 5 further comprising means for erasing marks made by said at least one writing instrument.

* * * * *